April 5, 1960
C. VINTEN
2,931,284
CURTAIN SHUTTER FOR CAMERAS
Filed April 2, 1954
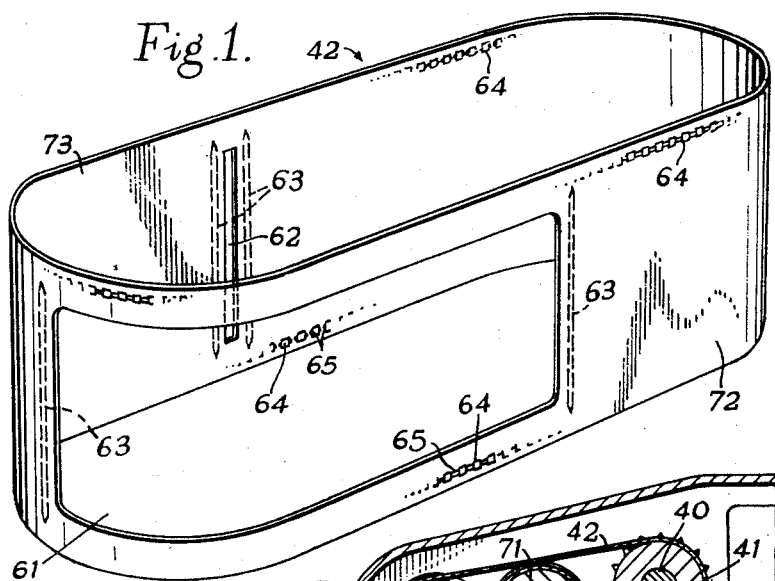
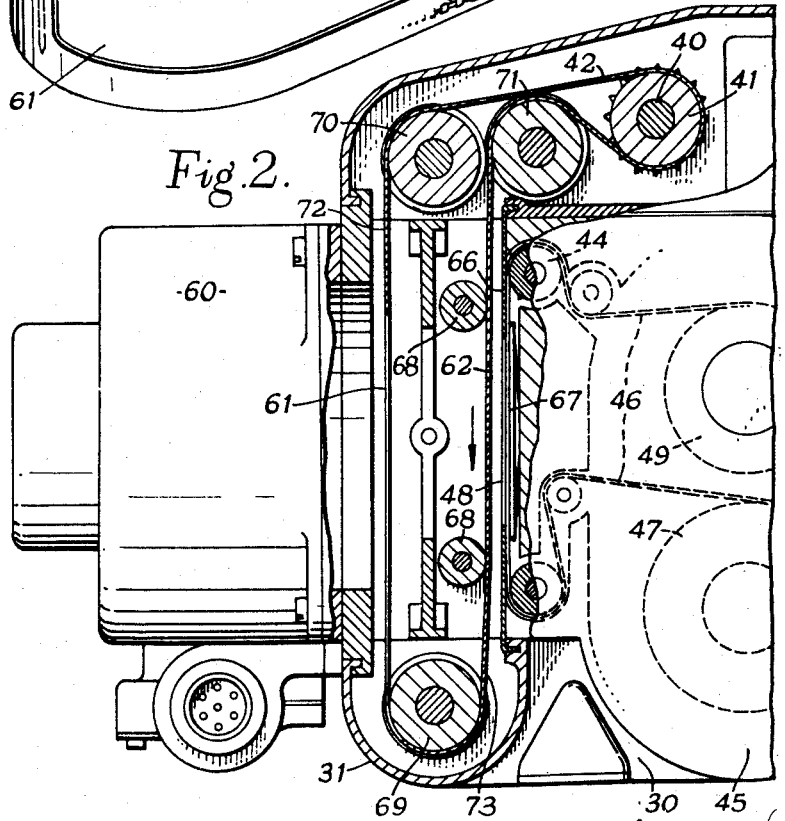
INVENTOR:
Charles Vinten
BY
Cushman, Darby + Cushman
ATTORNEYS

2,931,284
CURTAIN SHUTTER FOR CAMERAS

Charles Vinten, London, England

Application April 2, 1954, Serial No. 420,663

Claims priority, application Great Britain April 28, 1953

6 Claims. (Cl. 95—57)

This invention relates to improved shutter mechanisms for photographic cameras generally, and provides a novel and efficient form of shutter which has particular usefulness in cameras used in aircraft travelling at high speeds and relatively low altitudes for obtaining photographs of objects on the ground.

In its broadest aspect the invention resides in the use of an endless curtain or band, instead of the conventional type of shutter mechanism, such band having a comparatively narrow transversely extending aperture that is periodically moved across the path of the light transmitted by the lens assembly onto the sensitive film. For practical reasons, the band is led back and forth across the front of the film, for which purpose in addition to the narrow aperture or slit as it is referred to in the specific description that follows, the band is also provided with a much broader transversely extending aperture, preferably of substantially rectangular shape, spaced apart from said slit by a predetermined distance.

In use this endless band is supported upon at least two rotatable spools or the like provided in a camera between the lens and the sensitized film so as to be rotatable to bring the lens, the aperture, the slit and a portion of the film into alignment with one another as the slit sweeps across such film. The length of the endless band forming the shutter and the disposition therein of the said slit and aperture are preferably such that in one complete revolution of the shutter upon its supports such alignment is effected once only.

During the cycle of revolution of the shutter band, the sensitized film is advanced by a distance slightly greater than the width of one frame or photograph, such advancing movement taking place when the slit and the aperture in the shutter band are out of register, and the film being stationary over the period when the slit and the aperture are in register.

Figure 1 of the accompanying drawings shows an example of an endless band constructed in accordance with the invention, and Figure 2 shows a partly cut away plan view of a camera in which such band is mounted.

The endless curtain or band 42 (shown in perspective in Fig. 1) which is formed of a tough, opaque, flexible material, has a comparatively large aperture 61 and a narrow slit 62 cut therein. In its preferred form the band is formed of a textile fabric, preferably of cotton fibres, impregnated with a synthetic rubber, for example neoprene, and is provided with reinforcements 63 extending transversely of the width of the band, over the major part of such width, adjacent to the lateral edges both of the slit 62 and of the aperture 61. The said reinforcement may advantageously take the form of lengths of thin-gauge metal wire held between two thicknesses of fabric impregnated and bonded together by means of the synthetic rubber above mentioned, to form a composite fabric from which the band 42 is made.

The edges of the curtain or band 42 are perforated to co-operate with a driving sprocket wheel 41, and for added resistance against tearing the edges of such perforations 64 are preferably reinforced by means of small metal members 65 that extend between adjacent perforations and embrace the end edges thereof.

The band 42 shown mounted in a camera in Fig. 2 extends over idler rollers 69, 70 and 71 and the driving sprocket wheel 41, the spindle 40 of which is arranged to be continuously driven by suitable driving means arranged beneath the floor 30 of the chassis 31 of the camera. An example of such driving means is described in United States patent application Serial No. 420,661, now Patent No. 2,849,914 (British application No. 34476/53), which also contains a description of means for intermittently driving a film sprocket 44, and for continuously driving a take-up spool 49, whereby film 46 is fed from a feed-off spool 47 in magazine 45 across an aperture 48 in a plate 66 and onto such take-up spool 49, a spring plate 67 holding the film 46 tightly against the portion of the plate 66 surrounding the aperture 48 therein.

The remaining parts of the camera visible in the present drawings are a further pair of idling rollers 68 that serve to maintain accurate spacing between the curtain or band 42 and the plate 66, and an iris and lens assembly 60 details of which form the subject matter of United States patent application Serial No. 420,662 (British application No. 11774/53).

The band 42 is shown in Fig. 2 in the position just at the commencement of the exposure of one frame of the film 46. The light entering the camera through the iris and lens assembly 60 is free to fall on the part of the curtain or band 42 in which the slit 62 is situated since the aperture 61 is positioned therebetween. This part of the band in which the slit 62 is situated, is, in this position, arranged adjacent the aperture 48 in the plate 66; and, as the band continues to travel in the direction of the arrows, such slit 62 sweeps across in front of the film and allows the light to fall thereon. When the slit 62 reaches the far end of the aperture 48, the aperture 61 in the band 42 will still be in register therewith, this mode of operation requiring the breadth of such aperture 61 (i.e. in the longitudinal direction of the band) to be not less than approximately twice the corresponding dimension of the aperture 48. After the slit 62 has passed around the roller 69, it moves in the other direction in front of the face of the aperture 48, but at this time the aperture 61 in the band 42 will be in the part of such band extending around the sprocket and idler wheels 41, 70 and 71, and it will not reach a position in register with the aperture 48 until after the slit 62 has travelled beyond a position in which it could allow light to pass to the film. The latter will accordingly remain masked until, after one whole revolution of the curtain or band 42, the operation described above is repeated, the film having meanwhile been advanced by one frame.

To fulfil these requirements the length of the longer imperforate portion 72 of the band 42 between the aperture 61 and the slit 62 will need to be at least as great as the sum of the breadth of the aperture 61 itself and the length of the shorter imperforate portion 73 between such aperture and slit. The maximum length of the portion 73 will be determined by the distance between the roller 69 and the edge of the aperture 48 nearer thereto, in order that the leading edge of such portion 73 (the trailing edge of the aperture 61) should not pass across the path of the light directed onto the film before the slit 62 has completed its sweep across the face thereof.

It has been found that with the improved shutter of this invention it has been possible in practice to obtain satisfactory aerial photographs at a considerably greater rate than has hitherto been possible; for example as many as eight separate frames have been taken per second with a camera incorporating a shutter according to the invention, with satisfactory results from the photographic viewpoint.

I claim:

1. An endless opaque shutter curtain for aircraft cameras and the like, said curtain having a transverse slit for scanning the film during an exposure and a wide aperture for admitting light to the slit only when the latter is scanning the film, said slit being spaced from the wider aperture by opaque portions of said curtain, the length of one of the opaque portions being at least equal to the sum of the length of the wide aperture and the other opaque portion whereby when rotatably mounted in a camera only one exposure will be made upon each revolution of the curtain and the film will be masked at all times other than during an intended exposure.

2. A shutter curtain according to claim 1, said curtain being of flexible textile fabric of cotton fibers impregnated with synthetic rubber.

3. A shutter curtain as called for in claim 2 in which the textile fabric comprises two webs bonded by impregnated rubber, and reinforcing strips positioned adjacent the boundaries of said slit and said aperture and extending transversely to the side of the band.

4. A shutter curtain as called for in claim 3 in which the reinforcing strips are formed of thin gauge metal wire incorporated between the webs of the fabric.

5. In combination with a camera having a pair of spaced guide rollers, a driving sprocket, an apertured plate between said rollers, a shutter mechanism including an endless opaque shutter curtain passing over said guide rollers and masking the film of said camera, said curtain having a transverse slit for scanning the film during an exposure and an elongated aperture for admitting light to the slit only when the latter is scanning the film, said slit being spaced from the elongated aperture by opaque portions of said curtain, and the length of one of the opaque portions being at least equal to the sum of the length of the elongated aperture and the other opaque portion so as to insure only one exposure being taken upon each revolution of the curtain and the film being masked at all times other than during an intended exposure.

6. In a photographic camera having a lens assembly and means for aligning successive frames of sensitive film to record the light transmitted by such assembly, an endless opaque shutter curtain mounted for rotation between said lens assembly and sensitive film, said curtain having a transverse slit for scanning the film during an exposure and a wide aperture for admitting light to the slit when the slit is scanning the film, said aperture and slit being longitudinally spaced by portions of said curtain, the length of the wide aperture being at least twice the distance travelled by the slit during exposure, and one of said portions separating said aperture from said slit being greater than the other of said portions to insure only one exposure of said film upon each revolution of said curtain.

References Cited in the file of this patent

UNITED STATES PATENTS

| | | |
|---|---|---|
| 835,127 | Borsum | Nov. 6, 1906 |
| 885,612 | Hall | Apr. 21, 1908 |
| 940,714 | Niss | Nov. 23, 1909 |
| 1,003,536 | Spinks | Sept. 19, 1911 |
| 1,515,343 | Dilks | Nov. 11, 1924 |
| 2,188,065 | Steiner | Jan. 23, 1940 |